United States Patent
Morroney

(10) Patent No.: US 9,377,140 B2
(45) Date of Patent: Jun. 28, 2016

(54) CONFIGURABLE COUPLING APPARATUS FOR TUBULAR ELEMENTS

(71) Applicant: ALKON CORPORATION, Fremont, OH (US)

(72) Inventor: Wayne D Morroney, Fremont, OH (US)

(73) Assignee: ALKON CORPORATION, Fremont, OH (US)

( * ) Notice: Subject to any disclaimer, the term of this patent is extended or adjusted under 35 U.S.C. 154(b) by 0 days.

(21) Appl. No.: 14/325,434

(22) Filed: Jul. 8, 2014

(65) Prior Publication Data

US 2016/0010775 A1    Jan. 14, 2016

(51) Int. Cl.

| F16L 21/02 | (2006.01) |
|---|---|
| F16L 33/00 | (2006.01) |
| F16L 43/00 | (2006.01) |
| F16L 41/02 | (2006.01) |
| F16L 21/00 | (2006.01) |
| F16L 27/08 | (2006.01) |
| F16L 37/02 | (2006.01) |

(52) U.S. Cl.
CPC ............. *F16L 33/00* (2013.01); *F16L 21/002* (2013.01); *F16L 21/02* (2013.01); *F16L 27/08* (2013.01); *F16L 37/02* (2013.01); *F16L 41/021* (2013.01); *F16L 43/00* (2013.01)

(58) Field of Classification Search
CPC ..... F16L 33/20; F16L 33/207; F16L 33/2073; F16L 33/2075; F16L 33/2076; F16L 33/227
USPC .................................. 285/179, 323, 280, 281
See application file for complete search history.

(56) References Cited

U.S. PATENT DOCUMENTS

| 102,443 A * | 4/1870 | Smith ....................... 285/133.11 |
|---|---|---|
| 1,297,719 A | 3/1919 | Myers |
| 2,458,874 A | 1/1949 | Parker |
| 2,481,404 A * | 9/1949 | Donner ......................... 285/179 |
| 2,705,652 A | 4/1955 | Kaiser |
| 3,233,924 A | 2/1966 | Stanley et al. |
| 3,394,950 A | 7/1968 | Jensen |
| 3,784,233 A * | 1/1974 | Hilbert .......................... 285/179 |
| 3,815,940 A | 6/1974 | Luckenbill |
| 3,900,221 A * | 8/1975 | Fouts ............................ 285/179 |
| 3,951,441 A | 4/1976 | Scheuer et al. |
| 4,045,055 A | 8/1977 | Blakely |
| 4,157,325 A | 6/1979 | Charles et al. |
| 4,168,259 A | 9/1979 | Coleman |
| 4,186,946 A * | 2/1980 | Snow .............................. 285/94 |
| 4,220,359 A | 9/1980 | Evenson et al. |
| 4,293,149 A | 10/1981 | Bonel |
| 4,304,426 A | 12/1981 | Francis |
| 4,363,337 A | 12/1982 | Pease |
| 4,538,339 A | 9/1985 | Ewing |
| 4,573,716 A * | 3/1986 | Guest ............................ 285/323 |

(Continued)

*Primary Examiner* — David E Bochina
(74) *Attorney, Agent, or Firm* — Young Basile Hanlon & MacFarlane P.C.

(57) ABSTRACT

A coupling apparatus that is attachable to a substantially tubular element having a passageway extending therethrough. The coupling apparatus has a coupling body and at least one adapter. The coupling body has a passageway extending therethrough and at least one leg having at least one annular groove. The adapter has a passageway extending therethrough and a radially extending inward portion for engaging the annular groove on the leg of the coupling body for connecting the adapter to the coupling body. The adapter is connectable to the tubular element for forming a continuous passageway through the coupling apparatus.

20 Claims, 6 Drawing Sheets

(56) References Cited

U.S. PATENT DOCUMENTS

| | | | |
|---|---|---|---|
| 4,647,082 A | 3/1987 | Fournier et al. | |
| 4,666,192 A | 5/1987 | Zamora | |
| 4,784,409 A | 11/1988 | Piechowiak | |
| 4,817,996 A * | 4/1989 | Fouts | 285/179 |
| 4,905,766 A | 3/1990 | Dietz et al. | |
| 5,042,844 A | 8/1991 | Iida et al. | |
| 5,109,929 A | 5/1992 | Spears | |
| 5,340,168 A * | 8/1994 | Barker | 285/276 |
| 5,378,023 A * | 1/1995 | Olbrich | 285/256 |
| 5,431,456 A | 7/1995 | Okumura et al. | |
| 5,580,099 A | 12/1996 | Eaton | |
| 5,647,612 A | 7/1997 | Yoshida et al. | |
| 5,649,723 A | 7/1997 | Larsson | |
| 5,683,120 A | 11/1997 | Brock et al. | |
| 5,909,902 A | 6/1999 | Seabra | |
| 5,988,131 A | 11/1999 | Hernandez et al. | |
| 6,447,019 B1 * | 9/2002 | Hosono et al. | 285/323 |
| 6,523,862 B1 * | 2/2003 | MacDuff | 285/256 |
| 6,554,323 B1 * | 4/2003 | Salomon-Bahls et al. | 285/323 |
| 6,676,166 B1 | 1/2004 | Wraith et al. | |
| 6,764,102 B2 * | 7/2004 | Ezura | 285/323 |
| 6,843,507 B2 * | 1/2005 | Muto | 285/323 |
| 7,093,862 B2 * | 8/2006 | Muto | 285/323 |
| 7,267,374 B2 * | 9/2007 | Nielson | 285/353 |
| 7,475,913 B2 * | 1/2009 | Muto | 285/323 |
| 7,611,172 B2 * | 11/2009 | Baving et al. | 285/340 |
| 8,025,318 B1 | 9/2011 | Morroney et al. | |
| 8,056,937 B2 * | 11/2011 | Guest | 285/323 |
| 2005/0012328 A1 * | 1/2005 | Baving et al. | 285/242 |

* cited by examiner

CONFIGURABLE COUPLING APPARATUS FOR TUBULAR ELEMENTS

TECHNICAL FIELD

The present invention relates generally to couplings, and more particularly, a light-weight, robust coupling apparatus for carrying fluids.

BACKGROUND

Push-to-connect fittings are well known and used in a wide-variety of pneumatic, hydraulic, and other fluid transport applications because of their ability to quickly connect and disconnect tubular elements. In automotive applications, push-to-connect fittings are frequently used to connect various sections of tubing in air suspension systems, braking systems, and transmissions. The Department of Transportation (DOT) and Society of Automotive Engineers (SAE) have implemented various standards for such fittings. For example, pull tests for the fittings include withstanding 150 lbs of force for a ⅜" tube fitting and 200 lbs of force for a ½" fitting in both ambient temperature and boiling water. Low temperature impact testing requires the fitting to withstand a one pound weight being dropped on a nose of the fitting at −40° F. To meet these standards, previous push-to-connect fitting designs have utilized barbs that are pushed into the smooth bore of a plastic body of the fitting. However, barbs have a tendency to migrate when being pulled, and thus, certain designs place a metal ring on the outside diameter of the fitting to prevent the plastic body from expanding and allowing the barbed piece from becoming disconnected from the plastic body. The use of such metal rings increases material and manufacturing costs, which is undesirable in an industrial environment.

In addition, previous designs have also utilized plastic ends to connect the tubular elements to the body of the fitting. These plastic ends are susceptible to shattering or cracking, which is also undesirable in an industrial environment.

Therefore, it is desirable to have a coupling apparatus that is DOT and SAE compliant (i.e., will withstand the appropriate force levels during pull testing and will not shatter during low temperature impact testing), while weighing less and costing less to manufacture than conventional push-to-connect fittings.

SUMMARY

The present invention provides a coupling apparatus that is attachable to a substantially tubular element having a passageway extending therethrough. The coupling apparatus has a coupling body and at least one adapter. The coupling body has a passageway extending therethrough and at least one leg having at least one annular groove. The adapter has a passageway extending therethrough and a radially extending inward portion for engaging the annular groove on the leg of the coupling body for connecting the adapter to the coupling body. The adapter is connectable to the tubular element for forming a continuous passageway through the coupling apparatus.

The coupling body may be molded from glass-reinforced polybutylene terephthalate plastic. The coupling body may have two legs that extend at a substantially right angle with respect to each another. Alternatively, the coupling body may have a substantially linear configuration with two legs extending substantially coaxially with respect to each another. The coupling body could also have a substantially T-shaped configuration with three legs. Two of the legs are coaxial, and one of the legs is substantially perpendicular to the two legs. The leg of the coupling body may have two annular grooves and an annular protruding ridge formed thereon. The annular protruding ridge is disposed between the two annular grooves on the leg of the coupling body.

The adapter may be a push-to-connect adapter having a nose piece and a passageway extending therethough. The nose piece has an end for engaging the annular groove on the leg of the coupling body. The nose piece may be fabricated from a metallic material. The end of the nose piece may be crimped into the annular groove on the leg of the coupling body to secure the push-to-connect adapter to the coupling body. The push-to-connect adapter may have a tube support and a plurality of barbs extending substantially coaxially and on the exterior of the tube support. The tubular element is insertable between the tube support and the plurality of barbs to removably secure the tubular element to the coupling body. The push-to-connect adapter may also have a flexible O-ring disposed within the leg of the coupling body. The flexible O-ring forms a seal between the coupling body and the push-to-connect adapter.

The adapter may be a swivel nut adapter adaptable to receive the tubular element. The swivel nut adapter has a detent and passageway extending therethough. The detent protrudes from the swivel nut adapter for engaging the annular groove on the leg of the coupling body. The swivel nut adapter may have a flexible O-ring disposed in the annular groove on the leg of the coupling body. The O-ring forms a seal between the coupling body and the swivel nut adapter.

BRIEF DESCRIPTION OF THE DRAWINGS

The various features, advantages, and other uses of the present disclosure will become more apparent by referring to the following drawings, in which.

DETAILED DESCRIPTION

Figure 1:
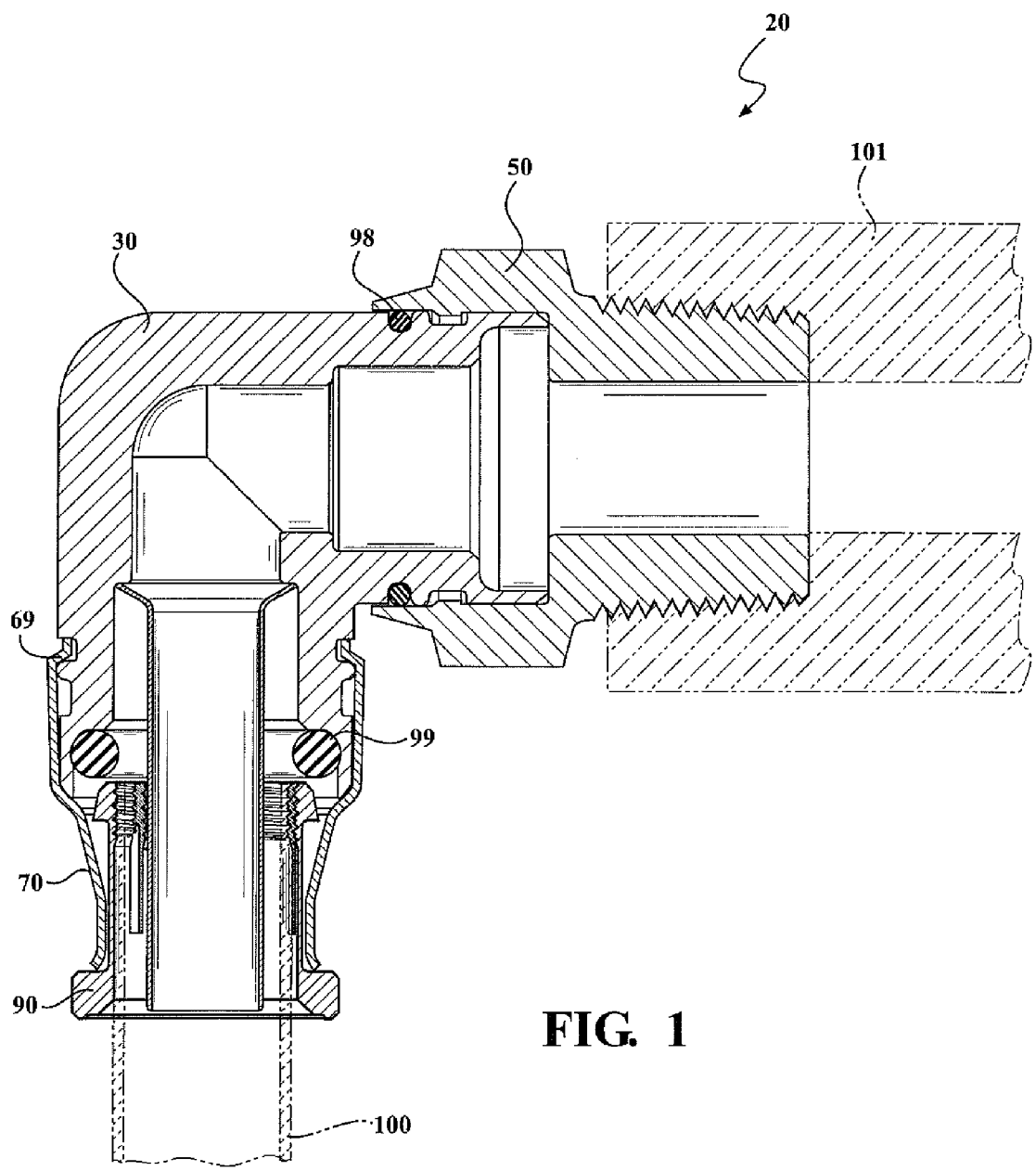
FIG. 1 is a sectional view of a coupling apparatus of the present invention.

The present invention relates to a coupling apparatus 20 that is compliant with DOT and SAE standards, weighs less, and costs less to manufacture than current push-to-connect fittings. Referring to FIG. 1, the coupling apparatus 20 provides a coupling body 30, a swivel nut adapter 50, and a push-to-connect adapter 90 with a nose piece 70. The coupling body 30 is adapted to be fitted with the swivel nut adapter 50 and/or the push-to-connect adapter 90 with the nose piece 70. The flexibility of the design allows the same coupling body 30 of the coupling apparatus 20 to be utilized with different assemblies rather than requiring a dedicated plastic body for each style of fitting, such as an elbow or T-shaped coupling body 30. The coupling apparatus 20 is ideally suited for, but not limited to, sealably connecting the ends of substantially tubular elements 100, 101, such as hoses or similar tubing, that may be formed of a synthetic resin, nylon, or the like, such as may be used in pneumatically operated applications, such as vehicle braking systems, air suspension systems, air valve transmissions, shifted hydraulic fan clutches, tailgate locks for dump trucks, belly dump air systems, etc.

Figure 2:
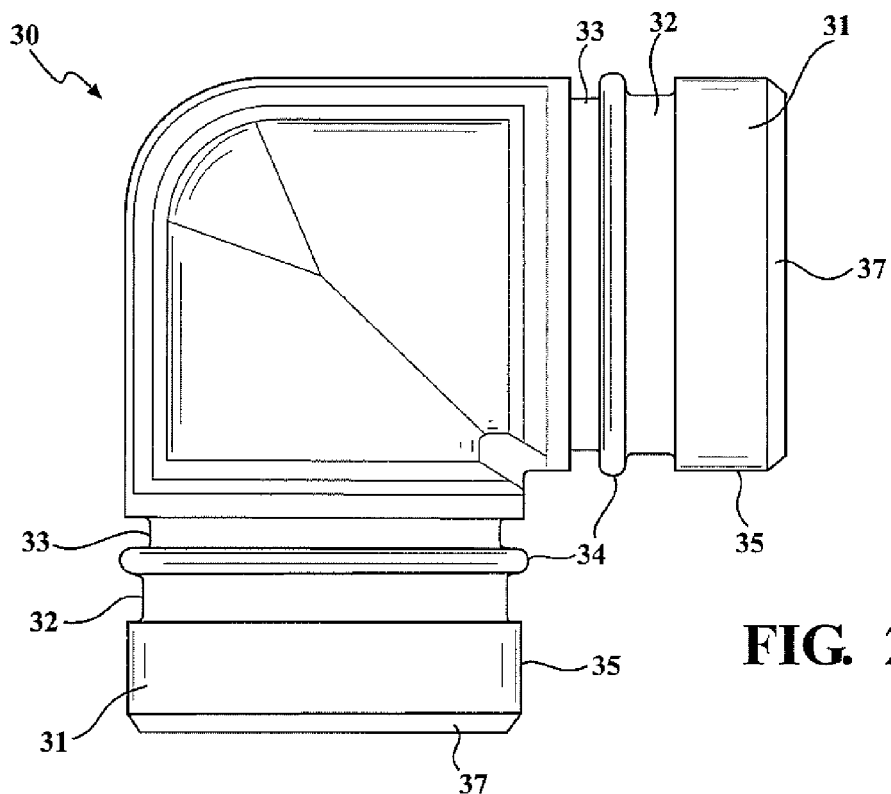
FIG. 2 is a front plan view of a coupling body of the coupling apparatus of the present invention.
Figure 3:
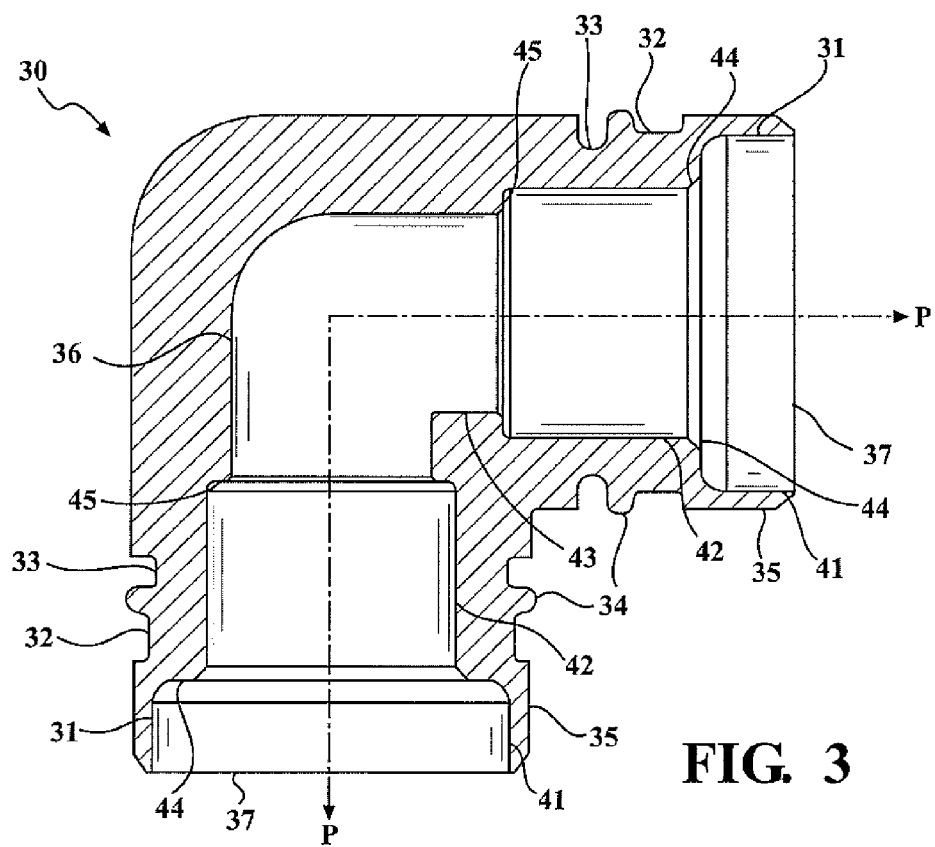
FIG. 3 is a sectional view of the coupling body of the coupling apparatus of the present invention shown in FIG. 2.

In order to reduce weight of the coupling apparatus 20, the coupling body 30 may be molded from glass reinforced polybutylene terephthalate plastic or a similar material. As seen in FIGS. 2-3, the coupling body 30 may have a substantially tubular right-angled configuration with an integral leg 31 formed at each end of the coupling body 30, wherein the legs 31 are substantially perpendicular to one another. A passageway P extends through an interior of the coupling body 30 and opens into the legs 31 at the ends of the coupling body 30. The legs 31 are substantially similar, which allows the legs 31 to accept either the swivel nut adapter 50 or the push-to-connect adapter 90. A first annular groove 32, a second annular groove 33, and an annular ridge 34 are formed in an outer surface 35 of each leg 31 of the coupling body 30. The first annular groove 32 and the second annular groove 33 are recessed into the outer surface 35 of each leg 31, and the annular ridge 34 protrudes outward from the outer surface 35 of each leg 31. The first annular groove 32 is spaced a longitudinal distance from the second annular groove 33, and the annular ridge 34 is formed between the first annular groove 32 and the second annular groove 33. The second annular groove 33 is recessed further into the outer surface 35 of each leg 31 than the first annular groove 32. Although the first annular groove 32 is shallower than the second annular groove 33, the first annular groove 32 is wider than the second annular groove 33. The annular ridge 34 has a radiused or rounded outer circumference that has a slightly larger outer diameter than the rest of the coupling body 30 and may be integrally formed with the coupling body 30.

To allow fluids, such as air, to pass through the coupling apparatus 20, the passageway P provides an interior void extending through the coupling body 30. The passageway P has a substantially cylindrical stepped configuration starting from a free end 37 of each leg 31 of the coupling body 30. The passageway P is formed by a first hollow portion 41, a narrower second hollow portion 42, and an even narrower connecting hollow portion 43 of the coupling body 30. The passageway P is defined by an inner surface 36 of the coupling body 30. The first hollow portion 41 of the passageway P opens into the free end 37 of the leg 31 and communicates with the second hollow portion 42 of the passageway P extending toward the interior of the coupling body 30. The second hollow portion 42 of the passageway P communicates with the connecting hollow portion 43 of the passageway P, which is furthest inward in the coupling body 30. A first annular shoulder 44 is formed between the first hollow portion 41 and the second hollow portion 42, and a second annular shoulder 45 is formed between the second hollow portion 42 and the connecting hollow portion 43 of the passageway P. The connecting hollow portion 43 of the passageway P extends at a substantially right angle, such that the passageway P extends through the coupling body 30.

Figure 4:
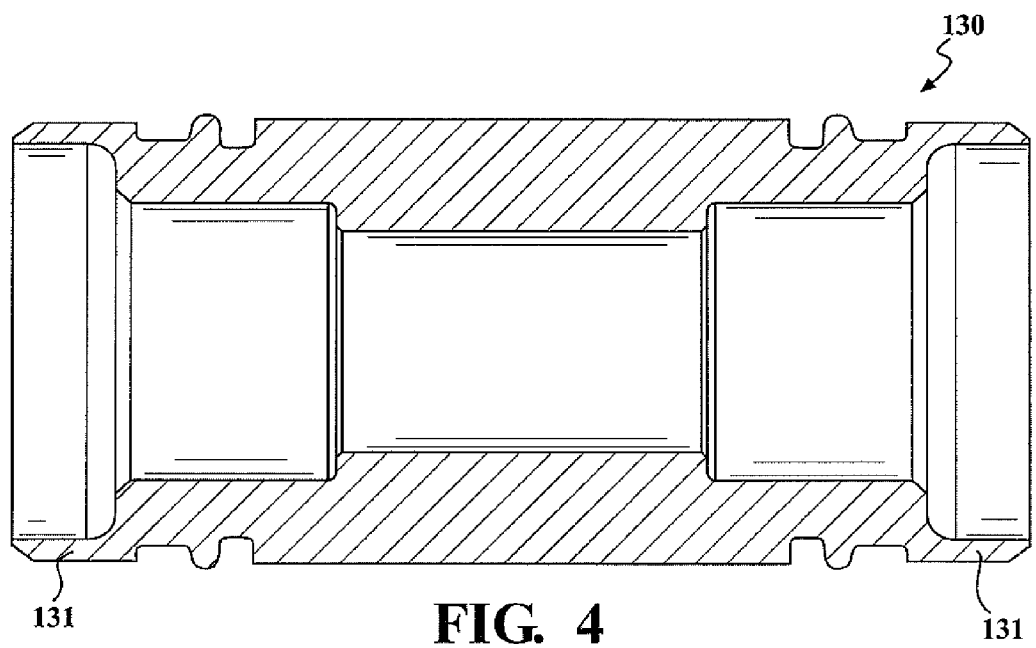
FIG. 4 is a sectional view of a first alternative embodiment of the coupling body of the coupling apparatus of the present invention.
Figure 5:
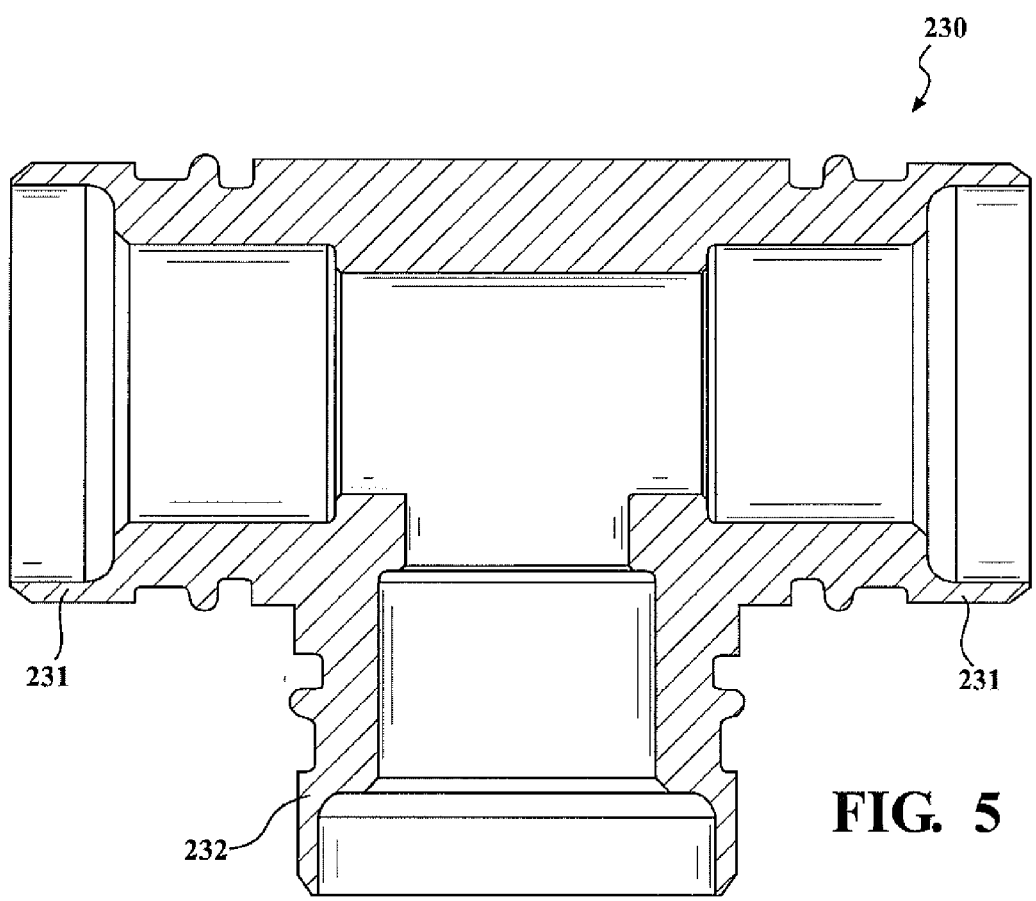
FIG. 5 is a sectional view of a second alternative embodiment of the coupling body of the coupling apparatus of the present invention.

As previously noted in FIGS. 1-3, the coupling body 30 has two legs 31 that are at a substantially right angle to one another, which results in an elbow connector. However, the coupling body 30 may adopt differing configurations to create other types of connectors. For example, in a first alternative embodiment shown in FIG. 4, a coupling body 130 has two legs 131 that are substantially linear or coaxial about a longitudinal axis to form a substantially straight connector. In a second alternative embodiment shown in FIG. 5, a coupling body 230 has a substantially T-shape configuration with three legs 231 being utilized to create a tee connector. Two of the legs 231 are substantially coaxial and linear about a longitudinal axis and one leg 232 is substantially perpendicular to the other two legs 231. The coupling bodies 30, 130, 230 are substantially similar except for the configuration of the legs 31, 131, 231, 232.

Figure 6:
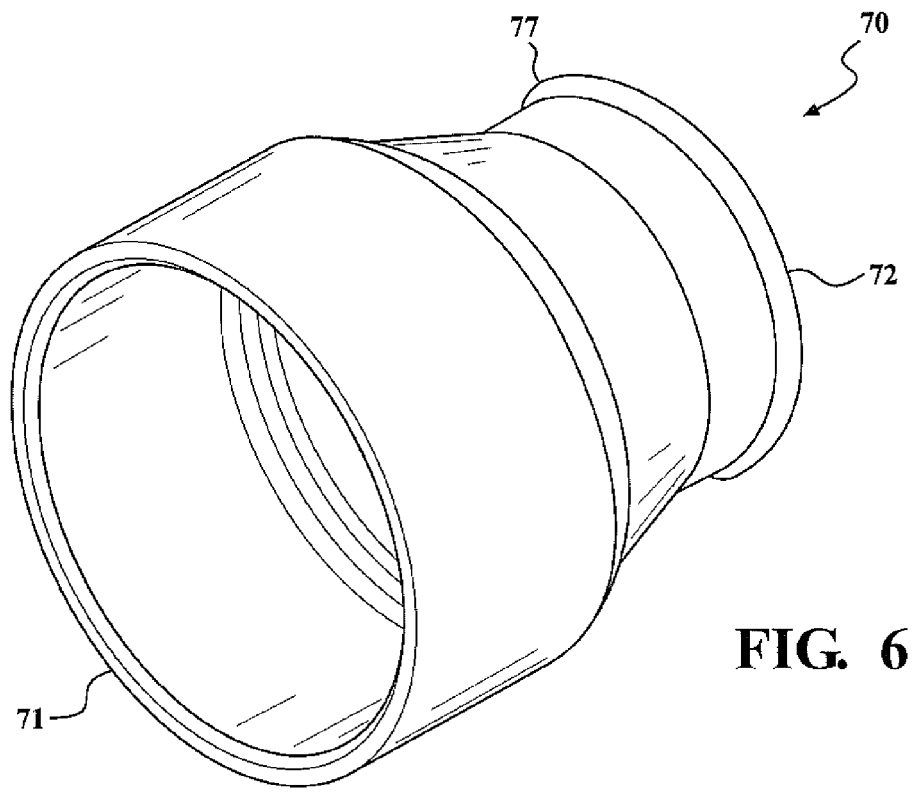
FIG. 6 is a perspective view of a nose piece of the coupling apparatus of the present invention.
Figure 7:
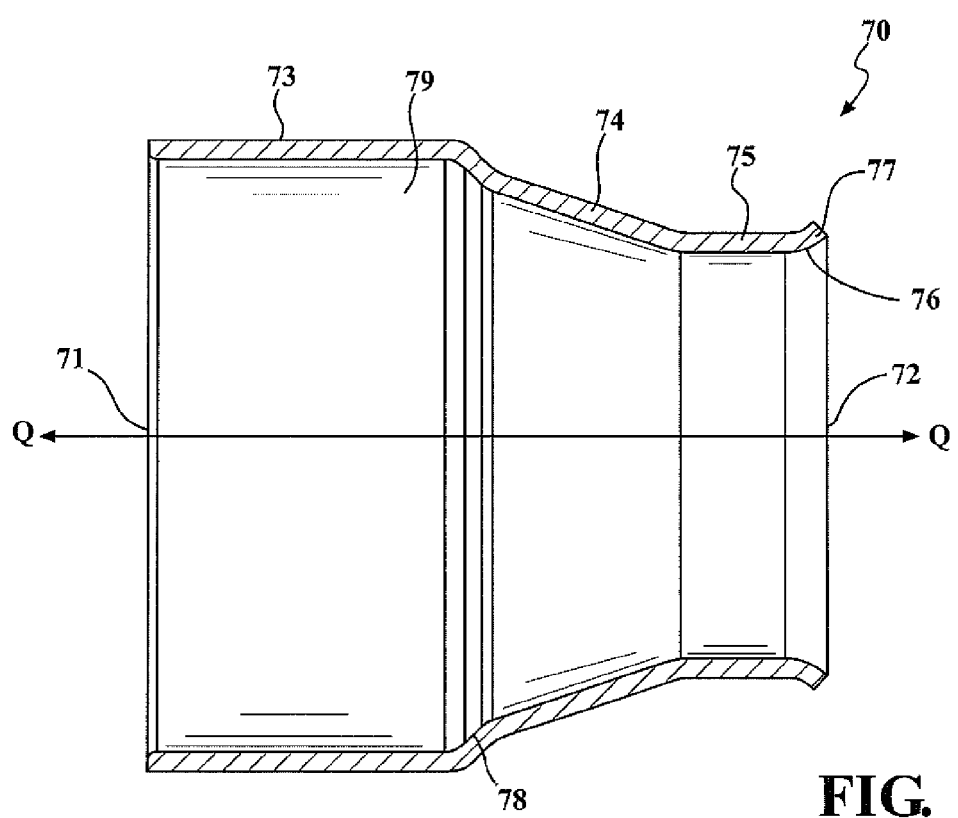
FIG. 7 is a sectional view of the nose piece of the coupling apparatus of the present invention shown in FIG. 6.

In order to protect the ends of the coupling body 30, the nose piece 70, as seen in FIGS. 6-7, is deep drawn from sheet metal having a substantially uniform thickness throughout. The nose piece 70 has a hollow, substantially cylindrical configuration with an interior passageway Q that extends through and between a first end 71 and a second end 72 of the nose piece 70 to allow fluid to flow therethrough. The passageway Q is defined by an interior surface 79 of the nose piece 70 having a stepped configuration that is divided into a first hollow portion 73, a second hollow portion 74, a third hollow portion 75, and a fourth hollow portion 76. The first hollow portion 73 is spaced longitudinally from and in communication with the second hollow portion 74, the second hollow portion 74 is spaced longitudinally from and in communication with the third hollow portion 75, and the third hollow portion 75 is spaced longitudinally from and in communication with the fourth hollow portion 76. The first hollow portion 73 opens into the first end 71 of the nose piece 70, and the fourth hollow portion 76 opens into the second end 72 of the nose piece 70. An annular shoulder 78 is formed between the first hollow portion 73 and the second hollow portion 74.

The first hollow portion 73 of the passageway Q is defined by a substantially constant inner diameter of the nose piece 70 extending the length of the first hollow portion 73. Similarly, the third hollow portion 75 is also defined by a substantially constant inner diameter of the nose piece 70 extending the length of the third hollow portion 75. However, the diameter of the first hollow portion 73 is larger than the diameter of the third hollow portion 75. The diameter of the second hollow portion 74 is defined by an inner diameter that tapers toward the radial center between the annular shoulder 78 and the third hollow portion 75. The fourth hollow portion 76 is defined by an inner diameter that tapers away from the radial center to create a lip 77 at the second end 72 of the nose piece 70.

Figure 8:
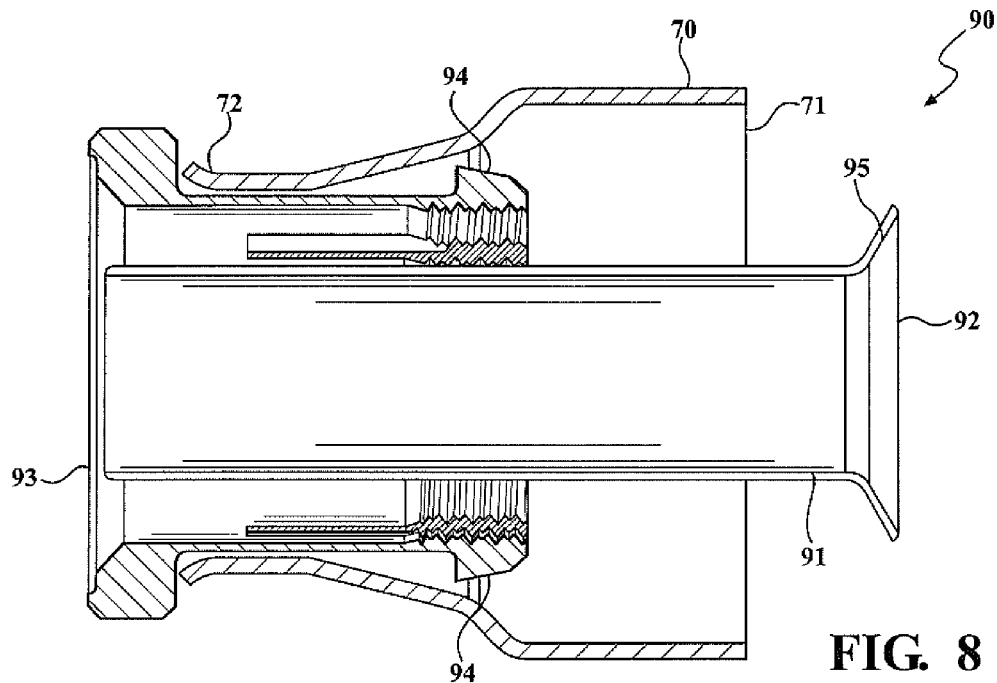
FIG. 8 is a sectional view of a push-to-connect fitting with the nose piece of the coupling apparatus of the present invention.

In order to connect the push-to-connect adapter 90 to the coupling body 30, the nose piece 70 is attached to the push-to-connect adapter 90, as shown in FIGS. 1 and 8. The push-to-connect adapter 90 provides a fixed tube support 91, a first end 92, a second end 93, and a plurality of barbs 94. The tube support 91 is a substantially cylindrical element having opened ends for receiving the substantially tubular element 100. The tube support 91 may be deep drawn from sheet metal and extends longitudinally from the first end 92 to a second end 93 of the push-to-connect adapter 90, wherein the tube support 91 extends beyond the first end 71 and the second end 72 of the nose piece 70. The tube support 91 has a substantially constant diameter throughout except at the first end 92 of the push-to-connect adapter 90 wherein the diameter extends radially outward to create a lip 95. The diameter of the tube support 91 at the first end 92 of the push-to-connect adapter 90 is slightly less than the diameter of the first hollow portion 41 of the coupling body 30 in order for the tube support 91 to fit within the first hollow portion 41 of the coupling body 30. The lip 95 of the tube support 91 may abut the second annular shoulder 45 of the coupling body 30 when the push-to-connect adapter 90 is inserted into the coupling body 30.

In order to removeably secure the substantially tubular element 100 that is received by the tube support 91 of the push-to-connect adapter 90, the plurality of barbs 94 provide resilient fingers that extend substantially coaxially with and surround the outside of the tube support 91. The plurality of barbs 94 extend from the second end 93 of the push-to-connect fitting for approximately half the length of the tube support 91. When the substantially tubular element 100 is inserted into the push-to-connect adapter 90, the plurality of barbs 94 are displaced radially outward away from the tube support 91, thereby biasing and gripping the plurality of barbs 94 against the substantially tubular element 100.

The nose piece 70 is attached to the push-to-connect adapter 90 such that the nose piece 70 surrounds the outside of the plurality of barbs 94 and is substantially coaxial with the tube support 91. The nose piece 70 is positioned so that the first end 71 of the nose piece 70 is closer to the first end 92 of the push-to-connect adapter 90 than the second end 72 of the nose piece 70, and the second end 72 of the nose piece 70 is closer to the second end 93 of the push-to-connect adapter 90 than the first end 71 of the nose piece 70.

Figure 9:
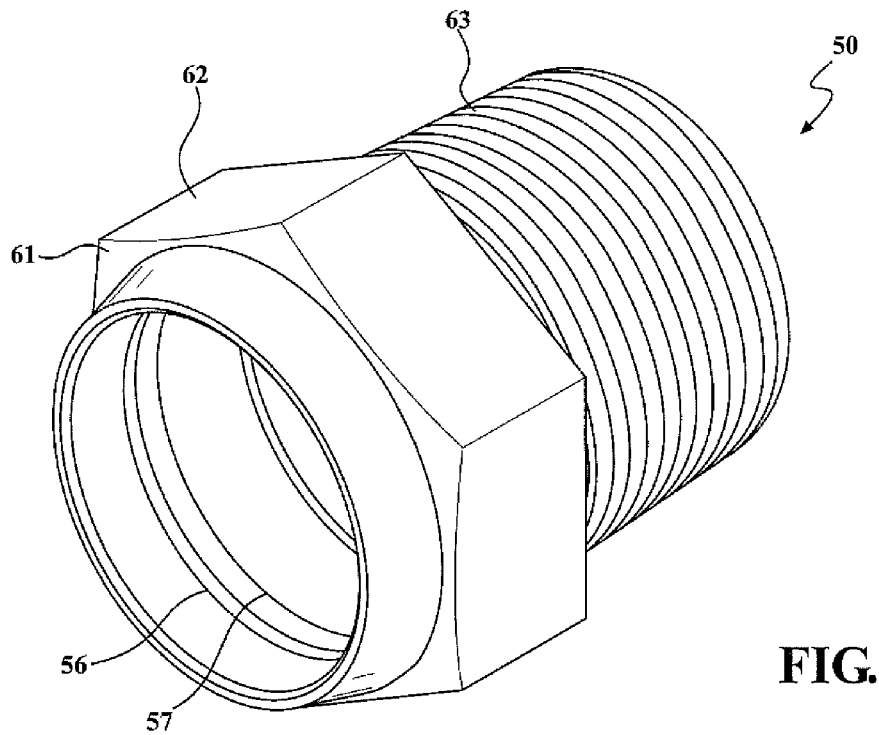
FIG. 9 is a perspective view of a swivel nut adapter of the coupling apparatus of the present invention.
Figure 10:
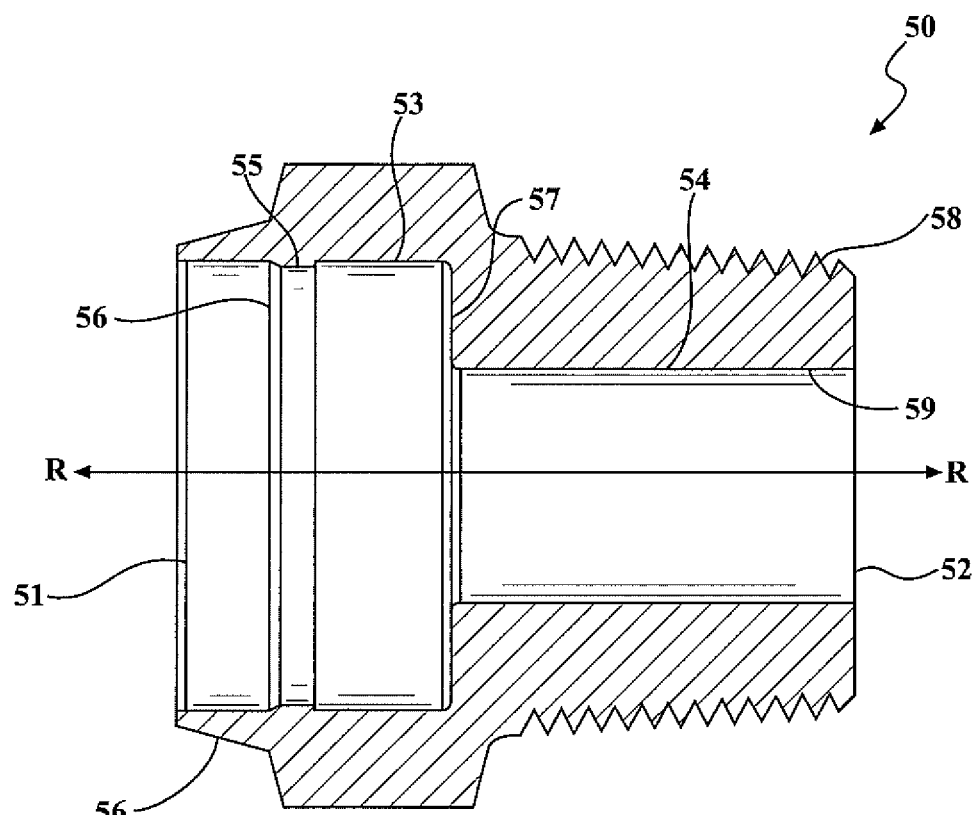
FIG. 10 is a sectional view of the swivel nut adapter of the coupling apparatus of the present invention shown in FIG. 9.

As an alternative structure for connecting the substantially tubular element 101 to the coupling body 30, the swivel nut adapter 50 provides a substantially tubular member with a passageway R extending between and through a first end 51 and a second end 52 of the swivel nut adapter 50, as seen in FIGS. 9-10. The swivel nut adapter 50 is made from a high strength, low weight material, such as aluminum or alloy steel. The passageway R allows fluid to flow through the swivel nut adapter 50, wherein the interior of the passageway R has a stepped configuration between the first end 51 and the second end 52 of the swivel nut adapter 50 that is formed by a first hollow portion 53 and a second hollow portion 54, defined by an inner surface 59 of the swivel nut adapter 50. The first hollow portion 53 opens into the first end 51 of the swivel nut adapter 50, and the second hollow portion 54 opens into the second end 52 of the swivel nut adapter, wherein the first hollow portion 53 is in communication with the second hollow portion 54. The first hollow portion 53 has substantially the same diameter throughout with the exception of a detent 55 near the middle of the first hollow portion 53 wherein the diameter of the first hollow portion 53 decreases slightly. The detent 55 protrudes from an inner surface 59 of the swivel nut adapter 50 into the first hollow portion 53. A first annular shoulder 56 is formed adjacent the detent 55 on the end of the detent 55 closest to the first end 51 of the swivel nut adapter 50. The second hollow portion 54 has substantially constant diameter throughout, wherein a second annular shoulder 57 is formed between the first hollow portion 53 and the second hollow portion 54.

An outer surface 58 of the swivel nut adapter 50 is divided into a first portion 61, a second portion 62, and a third portion 63. The first portion 61 is spaced longitudinally from and adjacent to the second portion 62, and the second portion 62 is spaced longitudinally from and adjacent to the third portion 63. The first portion 61 is closest to the first end 51, and the third portion 63 is closest to the second end 52. The second portion 62 extends between the first portion 61 and the third portion 63, wherein the first portion 61, the second portion 62, and the third portion 63 are coaxially aligned about a longitudinal axis. The third portion 63 has external threads for threadingly attaching the substantially tubular element 101. The second portion 62 has a hexagonal configuration that protrudes from the swivel nut adapter 50 for securing the swivel nut adapter 50 to the substantially tubular element 101 through the use of a conventional wrench. The first portion 61 tapers from the second portion 62 to the first end 51 of the swivel nut adapter 50 and is approximately the same distance from the radial center of the swivel nut adapter 50 as the third portion 63.

The coupling apparatus 20 is assembled by selecting whether each leg 31 of the coupling body 30 should be configured with the swivel nut adapter 50 or the push-to-connect adapter 90. If the coupling body 30 is to be configured with the push-to-connect adapter 90, a flexible, internal O-ring 99, shown in FIG. 1, may be inserted into the first hollow portion 41 of the coupling body 30 and seated adjacent to the first annular shoulder 44 before the push-to-connect adapter 90 is attached to the coupling body 30. The internal O-ring 99 prevents fluid from escaping between the coupling body 30 and the push-to-connect adapter 90. The first end 92 of the push-to-connect adapter 90 is then inserted into the free end 37 of the coupling body 30 until the lip 95 of the push-to-connect adapter 90 abuts the second annular shoulder 45 of the coupling body 30. The nose piece 70 overlaps the outer surface 35 of the leg 31 of the coupling body 30, covering the first annular groove 32, the annular ridge 34, and the second annular groove 33. Once the push-to-connect adapter 90 is inserted into the coupling body 30, the first end 71 of the nose piece 70 is crimped into the second annular groove 33 to secure the push-to-connect adapter 90 to the coupling body 30. The crimping process provides a crimped end portion 69 (shown in FIG. 1) on the first end 71 of the nose piece 70 that extends radially inward to engage the second annular groove 33 of the coupling body 30. The passageway Q formed in the push-to-connect adapter 90 communicates with the passageway P extending through the coupling body 30 so that fluid may flow freely between the push-to-connect adapter 90 and the coupling body 30. Although crimping the first end 71 of the nose piece 70 into the second annular groove 33 helps to prevent the coupling apparatus 20 from leaking fluid, the internal O-ring 99 between the push-to-connect adapter 90 and the coupling body 30 acts as the primary seal.

To connect the substantially tubular element 100 to the coupling apparatus 20 when the coupling body 30 is configured with the push-to-connect adapter 90, a free end of the hose or other similar tubular element is inserted between the plurality of barbs 94 and the tube support 91 until the free end rests near the first end 92 of the push-to-connect adapter 90. The substantially tubular element 100 is secured to the coupling apparatus 20 through the force applied by the plurality of barbs 94 and the nose piece 70. The nose piece 70 provides a stronger and more positive attachment than the plurality of barbs 94 alone because the nose piece 70 prevents the plurality of barbs 94 from expanding and allowing the substantially tubular element 100 from migrating out of the coupling apparatus 20.

If the coupling body 30 is to be configured with the swivel nut adapter 50, a flexible O-ring 98, shown in FIG. 1, may be placed in the second annular groove 33 of the coupling body 30. The O-ring 98 prevents fluid from escaping between the coupling body 30 and the swivel nut adapter 50. The swivel nut adapter 50 is attached to the coupling body 30 by inserting the free end 37 of the coupling body 30 into the first end 51 of the swivel nut adapter 50 until the free end 37 abuts the first annular shoulder 44 of the coupling body 30. The detent 55 on the swivel nut adapter 50 engages the first annular groove 32 of the coupling body 30 to secure the swivel nut adapter 50 to the coupling body 30. Once attached, the passageway R extending through the swivel nut adapter 50 communicates with the passageway P extending through the coupling body 30 so that fluid may flow freely between the swivel nut adapter 50 and the coupling body 30. To connect the substantially tubular element 101 to the coupling apparatus 20 when the coupling body 30 is configured with the swivel nut adapter 50, the substantially tubular element 101 may have internal threading for engaging the threads on the third portion 63 of the outer surface 58 of the swivel nut adapter 50.

While the invention has been shown and described with reference to a certain specific preferred embodiment, modification may now suggest itself to those skilled in the art. Such modifications and various changes in form and detail may be made herein without departing from the spirit and scope of the invention. Accordingly, it is understood that the invention will be limited only by the appended claims.

What is claimed is:

1. A coupling apparatus that is attachable to a tubular element having a passageway extending therethrough, comprising:
   a coupling body having a passageway extending therethrough and having at least two substantially similar legs, each leg having at least two adjacent annular grooves, wherein one of the at least two annular grooves is wider and shallower than the other annular groove; and
   at least one adapter having a passageway extending therethrough and an integrally formed, radially extending inward portion frictionally engaging at least one of the at least two annular grooves of one of the at least two legs of the coupling body for connecting the at least one adapter to the coupling body, wherein the at least one adapter is connectable to the tubular element for forming a continuous passageway through the coupling apparatus.

2. The coupling apparatus of claim 1, wherein each of the at least two legs of the coupling body have an annular protruding ridge integrally formed thereon and disposed between two of the at least two annular grooves on each of the at least two legs of the coupling body, wherein the annular protruding ridge has an outer diameter that is larger than an outer diameter of the leg of the coupling body.

3. The coupling apparatus of claim 2, wherein the coupling body has two legs that extend at a substantially right angle with respect to each other.

4. The coupling apparatus of claim 2, wherein the coupling body has a substantially linear configuration with two legs extending substantially coaxially with respect to each other.

5. The coupling apparatus of claim 2, wherein the coupling body has a substantially T-shaped configuration with three legs, wherein two of the three legs are coaxial and one of the three legs is substantially perpendicular to two of the three legs.

6. The coupling apparatus of claim 2, the at least one adapter further comprising:
   a push-to-connect adapter having a nose piece and a passageway extending therethrough, the nose piece having an end for engaging at least one of the at least two annular grooves of the at least one leg of the coupling body, being fabricated from a metallic material, and having a longitudinal length that is at least half of a longitudinal length of the leg of the coupling body to overlap and protect the leg of the coupling body.

7. The coupling apparatus of claim 6, wherein the end of the nose piece is crimped into one of the at least two annular grooves formed on one of the at least two legs of the coupling body to secure the push-to-connect adapter to the coupling body.

8. The coupling apparatus of claim 7, the push-to-connect adapter further comprising:
   a tube support;
   a plurality of barbs extending substantially coaxially with and on the exterior of the tube support; and
   a flexible O-ring disposed within the one of the at least two legs of the coupling body for which the push-to-connect adapter is engaging,
   wherein the tubular element is insertable between the tube support and the plurality of barbs to removably secure the tubular element to the coupling body, and the flexible O-ring forms a seal between the coupling body and the push-to-connect adapter.

9. The coupling apparatus of claim 2, the at least one adapter further comprising:
   a swivel nut adapter adaptable to receive the tubular element, and the swivel nut adapter having an integrally formed detent and passageway extending therethrough, wherein the detent protrudes from the swivel nut adapter for engaging one of the at least two annular grooves formed on one of the at least two legs of the coupling body.

10. The coupling apparatus of claim 9, the swivel nut adapter further comprising:
    a flexible O-ring disposed in one of the at least two annular grooves of the at least two legs of the coupling body, wherein the O-ring forms a seal between the coupling body and the swivel nut adapter.

11. The coupling apparatus of claim 2, wherein the at least two annular groves and the annular protruding ridge are formed on a first end of one of the at least two legs of the coupling body and the tubular element is inserted into the coupling body at the first end of one of the at least two legs of the coupling body.

12. A coupling apparatus that is engageable with at least two tubular elements, comprising:
    a coupling body having a passageway extending therethrough and at least two substantially similar legs, each of the at least two substantially similar legs releaseably and frictionally engaging a push-to-connect adapter and a swivel nut adapter, wherein each of the at least two substantially similar legs is only connected to at most one of either the push-to-connect adapter or the swivel nut adapter at any time, each substantially similar leg having at least one annular groove formed thereon, wherein the push-to-connect adapter is connectable to a first leg from the at least two substantially similar legs and the swivel nut adapter is connectable to a second leg from the at least two substantially similar legs;
    the push-to-connect adapter adaptable to receive and removably secure one of the at least two tubular elements to the coupling body, the push-to-connect adapter having a nose piece and a passageway extending therethrough, the nose piece having an end for frictionally engaging the at least one annular groove of one of the at least two legs of the coupling body; and
    the swivel nut adapter adaptable to receive the other of the at least two tubular elements to the coupling body, and the swivel nut adapter having an integrally formed detent and a passageway extending therethrough, wherein the detent protrudes from the swivel nut adapter for frictionally engaging the at least one annular groove on the other of the at least two legs of the coupling body.

13. The coupling apparatus of claim 12, wherein the coupling body is molded from glass reinforced polybutylene terephthalate plastic and the nose piece of the push-to-connect adapter is fabricated from a metallic material.

14. The coupling apparatus of claim 13, wherein the coupling body has two legs that extend at a substantially right angle with respect to each another.

15. The coupling apparatus of claim 13, wherein the coupling body has a substantially linear configuration with two legs extending substantially coaxially with respect to each other.

16. The coupling apparatus of claim 13, wherein the coupling body has a substantially T-shaped configuration with three legs, wherein two of the three legs are coaxial and one of the three legs is substantially perpendicular to the two of the three legs.

17. The coupling apparatus of claim 13, the swivel nut adapter further comprising:
   an O-ring disposed in the at least one annular groove on the coupling body, wherein the O-ring forms a seal between the coupling body and the swivel nut adapter.

18. The coupling apparatus of claim 13, the push-to-connect adapter further comprising:
   a tube support;
   a plurality of barbs extending substantially coaxially with and on the exterior of the tube support;
   a flexible O-ring disposed within the at least one leg of the coupling body, wherein the flexible O-ring forms a seal between the coupling body and the push-to-connect adapter; and
the nose piece having a longitudinal length that is at least half of a longitudinal length of the tube support and being fabricated from a metallic material to protect a free end of the leg of the coupling body that the push-to-connect adapter is engaging,
wherein the tubular element is insertable between the tube support and the plurality of barbs to removably secure the tubular element to the coupling body.

19. The coupling apparatus of claim 12, the coupling body further comprising:
   at least two annular grooves, one of the at least two annular grooves being shallower and narrower than the other annular groove; and
   an annular protruding ridge having sides that define sides of the at least two adjacent annular grooves.

20. A coupling apparatus that is engageable with at least two tubular elements, comprising:
   a coupling body molded from glass reinforced polybutylene terephthalate plastic and having a passageway extending therethrough and at least two substantially similar legs, each of the at least two substantially similar legs being adaptable to releaseably engage in a friction fit an adapter and having at least two annular grooves formed thereon with an annular protruding ridge disposed between the at least two annular grooves, one of the at least two annular grooves being shallower and narrower than the other annular groove, the annular protruding ridge having an outer diameter that is larger than the outer diameter of the leg of the coupling body, and the at least two annular grooves and the annular protruding ridge being formed on one end of the leg;
   the adapter having a passageway extending therethrough and an integrally formed, radially extending inward portion engaging in a friction fit at least one of the at least two annular grooves of one of the at least two substantially similar legs of the coupling body for connecting the adapter to the coupling body, wherein the adapter is connectable to the tubular element for forming a continuous passageway through the coupling apparatus.

* * * * *